United States Patent
Nakai et al.

(10) Patent No.: US 8,524,536 B2
(45) Date of Patent: Sep. 3, 2013

(54) OPTICAL FILM CUTTING METHOD AND APPARATUS USING THE SAME

(75) Inventors: Kouta Nakai, Ibaraki (JP); Junpei Kozasa, Ibaraki (JP); Yoshio Takahashi, Yokohama (JP); Masahiro Hosoi, Konosu (JP)

(73) Assignees: Nitto Denko Corporation, Osaka (JP); Akebono Machine Industries Co., Ltd., Saitama (JP)

( * ) Notice: Subject to any disclaimer, the term of this patent is extended or adjusted under 35 U.S.C. 154(b) by 390 days.

(21) Appl. No.: 12/673,502

(22) PCT Filed: Aug. 19, 2008

(86) PCT No.: PCT/JP2008/064746
§ 371 (c)(1),
(2), (4) Date: Feb. 14, 2010

(87) PCT Pub. No.: WO2010/021025
PCT Pub. Date: Feb. 25, 2010

(65) Prior Publication Data
US 2011/0203430 A1 Aug. 25, 2011

(51) Int. Cl.
*H01L 21/00* (2006.01)
*B32B 38/04* (2006.01)
(52) U.S. Cl.
USPC .................................... 438/113; 156/272.8
(58) Field of Classification Search
USPC ..................................... 438/113; 156/272.8
See application file for complete search history.

(56) References Cited

U.S. PATENT DOCUMENTS

| 3,674,194 | A | | 7/1972 | Moesser |
| 3,902,954 | A | * | 9/1975 | Lotto ............................ 156/510 |
| 4,838,319 | A | * | 6/1989 | Suwa .......................... 139/116.1 |
| 5,639,332 | A | * | 6/1997 | Instance ......................... 156/248 |
| 6,481,187 | B1 | * | 11/2002 | Behnke et al. .................. 53/471 |

(Continued)

FOREIGN PATENT DOCUMENTS

CN  1972776 A  5/2007
EP  2 065 119 A1  6/2009

(Continued)

OTHER PUBLICATIONS

International Search Report for the Application No. PCT/JP2008/064746 mailed Dec. 2, 2008.

(Continued)

*Primary Examiner* — William D Coleman
(74) *Attorney, Agent, or Firm* — Cheng Law Group, PLLC

(57) ABSTRACT

Nip rollers 11 and 12 each including a pair of upper and lower rollers are disposed on an upstream side and a downstream side with a portion to be cut of an optical film F located therebetween. In the nip roller 12, a center axis C of the upper roller 12b is displaced relative to a center axis L of the drive roller 12a in a direction away from the portion to be cut. Upon cutting of the polarizing film F, the upper rollers 11b and 12b are simultaneously moved downward, so that a timing at which the downstream nip roller 12 nips the polarizing film F is delayed. Further, the nip roller 12 pulls the polarizing film F in the direction away from the portion to be cut, so that tension is applied to the polarizing film F. In this state, the polarizing film F is cut by a laser device 10.

9 Claims, 3 Drawing Sheets

(56) References Cited

U.S. PATENT DOCUMENTS

| | | | |
|---|---|---|---|
| 6,887,330 B2* | 5/2005 | Onoshiro et al. | 156/159 |
| 6,991,695 B2* | 1/2006 | Tait et al. | 156/248 |
| 7,397,487 B2* | 7/2008 | Fukui | 347/139 |
| 2003/0208988 A1* | 11/2003 | Buckley | 53/411 |
| 2005/0036274 A1* | 2/2005 | Suhara et al. | 361/600 |
| 2005/0266198 A1* | 12/2005 | Downs et al. | 428/42.3 |
| 2008/0311338 A1* | 12/2008 | Petersen et al. | 428/99 |

FOREIGN PATENT DOCUMENTS

| | | |
|---|---|---|
| JP | 47-46948 B1 | 11/1972 |
| JP | 11-58061 A | 3/1999 |
| JP | 2000-246479 A | 9/2000 |
| JP | 2004-195510 A | 7/2004 |
| JP | 2006-150673 A | 6/2006 |
| JP | 2007-296623 A | 11/2007 |
| JP | 2008-73742 A | 4/2008 |

OTHER PUBLICATIONS

Taiwanese Office Action for the Application No. 097132261 from Taiwan Patent Office dated Jan. 15, 2013.

The First Office Action for Application No. 200880019330.8 from The State Intellectual Property Office of the People's Republic of China dated Sep. 19, 2012.

Notification of Second Office Action for the Application No. 200880019330.8 from The State intellectual Property office of P.R. China dated May 10, 2013.

* cited by examiner

OPTICAL FILM CUTTING METHOD AND APPARATUS USING THE SAME

TECHNICAL FIELD

The present invention relates to an optical film cutting method capable of accurately cutting an optical film such as a polarizing film, a brightness enhancement film or a retardation film to be bonded to a substrate for use in a liquid crystal panel or the like, and an apparatus using the same.

BACKGROUND ART

A conventional method for cutting a film to a predetermined length has been performed as follows. A first nip roller is disposed on an upstream side whereas a second nip roller is disposed on a downstream side. An object to be cut coated with a long laminate film is supplied between the two nip rollers. The laminate film is nipped by the two nip rollers and then is cut by a cutter disposed between the two nip rollers (refer to Patent Document 1).

Patent Document 1: JP 2007-296623 A

DISCLOSURE OF THE INVENTION

Problems to be Solved by the Invention

However, the conventional apparatus has the following problem. That is, even when the film is nipped by the nip rollers, satisfactory tension is not frequently applied to the film between the two nip rollers.

When satisfactory tension is not applied to the film, a wrinkle or a sag due to waviness occurs at a surface of the film. Consequently, there arises a problem that a length of the cut film varies.

In a case where the film is cut by use of a laser beam rather than the cutter, there arise the following problems. That is, since a focal depth of the laser beam varies at a portion to be cut, the film is cut by heat more than necessary because of an extension of a beam diameter. Moreover, the polarizing film is melted by heat generated when being cut, so that smoke is produced in large amount. Consequently, a component contained in the smoke adheres as a contaminant to the film.

This invention has been devised in view of the circumstances described above, and a principal object thereof is to provide an optical film cutting method capable of accurately cutting an optical film, and an apparatus using the same.

Solutions to the Problems

In order to accomplish the object described above, this invention employs the following configuration.

That is, this inventive method is an optical film cutting method for cutting an optical film to obtain a sheet-like member, including: nipping the strip-shaped optical film in a state that, in at least one of two nip rollers each including a pair of upper and lower rollers, the nip rollers being disposed on an upstream side and a downstream side of the strip-shaped optical film being transported with a portion to be cut of the optical film located therebetween in a transport direction, an axis of the upper roller is displaced relative to an axis of the lower roller in a direction away from the portion to be cut; and cutting the optical film in a width direction in a state that opposed ends of the optical film are nipped by the nip rollers.

According to this method, the axis of the upper roller that forms the nip roller is displaced relative to the axis of the lower roller in the direction away from the portion to be cut. Therefore, when the nip roller nips the polarizing film, the polarizing film is pulled outward with respect to the portion to be cut. In other words, tension is applied to the polarizing film located between the nip rollers. Accordingly, the polarizing film is cut in a state that no sag occurs thereat; therefore, it is possible to accurately keep the cut polarizing film at a constant length.

Further, in a case where the polarizing film is cut by use of, for example, a laser beam, a focal depth of the laser beam does not vary; therefore, it is possible to suppress a contaminant from adhering to the polarizing film because of an influence of smoke produced when the polarizing film is cut by heat more than necessary.

In the inventive method described above, preferably, in the state that the optical film is located between the nip rollers, one of the nip rollers, in which the upper and lower rollers are aligned with each other in a vertical direction, nips one of opposed ends of the optical film, and then the other nip roller, in which the upper and lower rollers are misaligned with each other, nips the other end of the optical film.

According to this method, of the two nip rollers, the nip roller, in which the rollers are misaligned with each other, nips the other end of polarizing film later. Thus, it is possible to apply tension to the polarizing film in the direction away from the portion to be cut in the state that one end of the polarizing film is fixed. That is, it is possible to suitably implement the inventive method described above.

In the inventive method described above, preferably, the optical film is cut by use of a laser beam.

According to this method, it is possible to prevent fluffing or cracking from occurring at a cut end surface of the polarizing film in a case where the polarizing film is cut by use of a cutter blade or the like.

In the case where the polarizing film is cut by use of the laser beam, preferably, the portion to be cut of the optical film is suction-held, the opposed ends of the optical film are nipped by the nip rollers with the portion to be cut located between the nip rollers, and subsequently the optical film is cut by use of the laser beam while the portion to be cut is sucked.

According to this method, smoke produced when the polarizing film is cut by use of the laser beam is sucked and removed. Therefore, it is possible to suppress a contaminant from adhering to the polarizing film because of an influence of the smoke.

In order to accomplish the object described above, moreover, this invention also employs the following configuration.

That is, an optical film cutting apparatus for cutting an optical film to obtain a sheet-like member includes: a supply device that supplies the strip-shaped optical film; a tension applying mechanism including two nip rollers each including a pair of upper and lower rollers, the nip rollers being disposed on an upstream side and a downstream side of the optical film being transported from the supply device, wherein in at least one of the nip rollers, an axis of the upper roller is displaced relative to an axis of the lower roller in a direction away from a portion to be cut; and a cutting device that cuts the optical film applied with tension by the tension applying mechanism in a transport direction.

With this configuration, the polarizing film located between the nip rollers can be accurately cut by the cutting device in the state that tension is applied thereto. Accordingly, it is possible to suitably realize the inventive method described above.

Preferably, the cutting device is a laser device. More preferably, the optical film cutting apparatus includes a suction table opposed to the laser device with the optical film interposed therebetween to suction-hold the optical film.

According to this configuration, it is possible to suitably realize the inventive method described above.

Effects of the Invention

In the optical film cutting method according to the present invention and the apparatus using the same, in at least one of the nip rollers disposed with the portion to be cut of the polarizing film located therebetween, the axis of the upper roller is displaced relative to the axis of the lower roller in the direction away from the portion to be cut. Thus, it is possible to apply appropriate tension to the polarizing film located between the nip rollers. Accordingly, the polarizing film is cut in the state that no sag occurs thereat; therefore, it is possible to accurately keep the cut polarizing film at a constant length.

DESCRIPTION OF REFERENCE SYMBOLS

Figure 1:
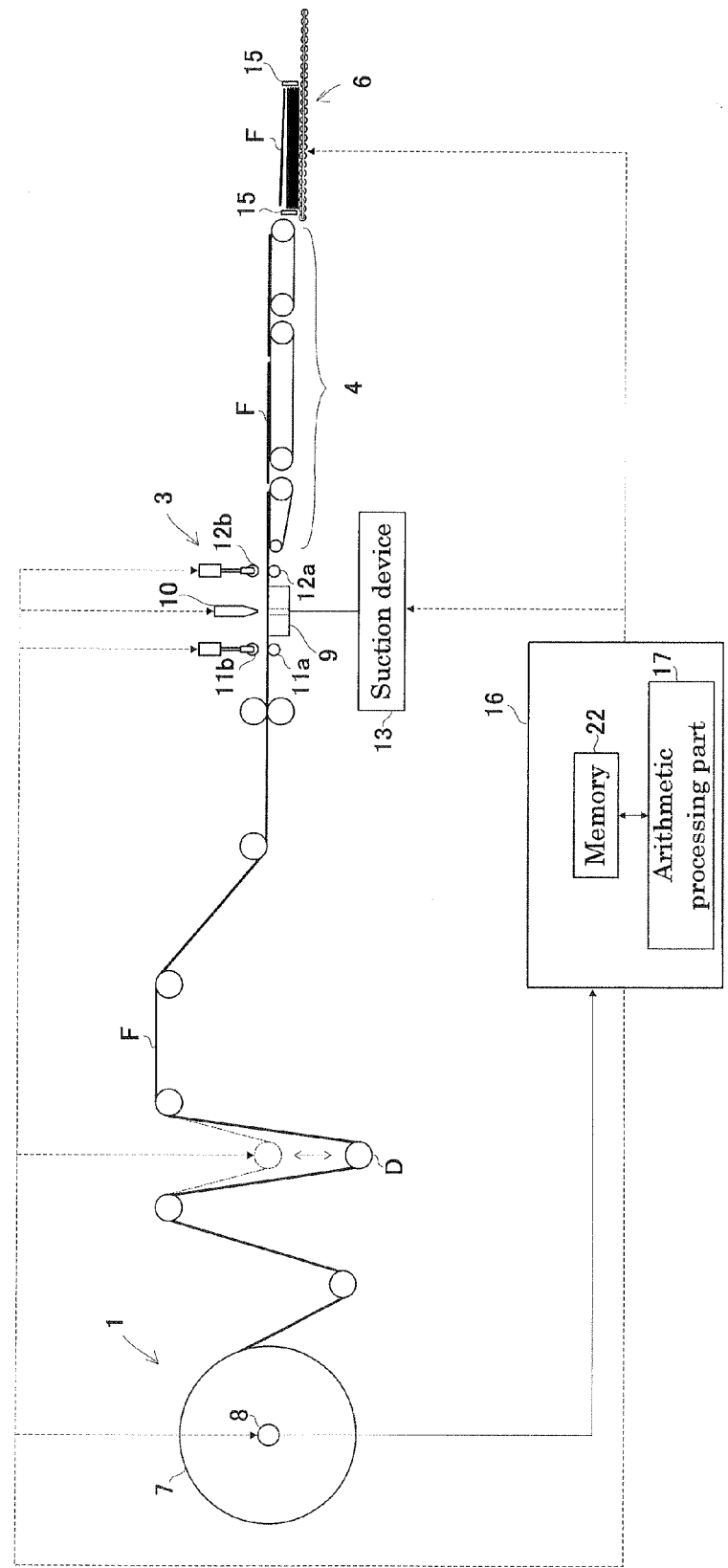
FIG. 1 shows a front view of a general configuration of an optical film cutting apparatus according to an embodiment of the present invention.

1 .... Film supply unit
3 .... Cutting mechanism
4 .... Transport mechanism
6 .... Carrying mechanism
9 .... Suction table
11 .... Nip roller
12 .... Nip roller
16 .... Control unit
F .... Polarizing film

BEST MODE FOR CARRYING OUT THE INVENTION

With reference to the drawings, hereinafter, description will be given of embodiments of the present invention. In the present invention, an optical member is not particularly limited as long as it is a flexible, strip-shaped and functional film such as a polarizing film, a retardation film or a brightness enhancement film. In the embodiment of the present invention, description will be given of a case of employing a polarizing film by way of example.

FIG. 1 shows a schematic configuration of an optical film cutting apparatus that performs an optical film cutting method according to the present invention and involves steps in which cut optical films are housed in a stack manner and are made carriable.

The apparatus according to this embodiment includes a film supply unit 1 that feeds and supplies a polarizing film F, a cutting mechanism 3 that cuts the polarizing film F to a predetermined length in a transport direction, a transport mechanism 4 that transports the cut polarizing film F, a carrying mechanism 6 that carries the polarizing film F, which is stacked at a terminal end of a transport path, to a subsequent step, and the like. It is to be noted that the film supply unit 1 corresponds to a supply device according to the present invention.

In the film supply unit 1, a bobbin 8 is loaded with a master roll 7 which is the polarizing film F in a roll state. Herein, the polarizing film F, which is wide in width, is slit to a predetermined dimension so as to have a strip shape. The bobbin 8 is coupled to a drive device such as a motor.

A dancer roller D is disposed between the film supply unit 1 and the cutting mechanism 3. The dancer roller D accumulates a feed amount of the polarizing film F supplied by the film supply unit 1, until the polarizing film F suction-held on a suction table 9 of the cutting mechanism 3 is cut by a laser device 10 and then the suction-holding is canceled.

The cutting mechanism 3 includes the suction table 9 that suction-holds a back side of the polarizing film F, the laser device 10, and a pair of nip rollers 11 and 12 that are disposed on upstream and downstream sides of the laser device 10, respectively, with the laser device 10 located therebetween to nip the polarizing film F. It is to be noted that the laser device 10 corresponds to a cutting device according to the present invention.

Figure 2:
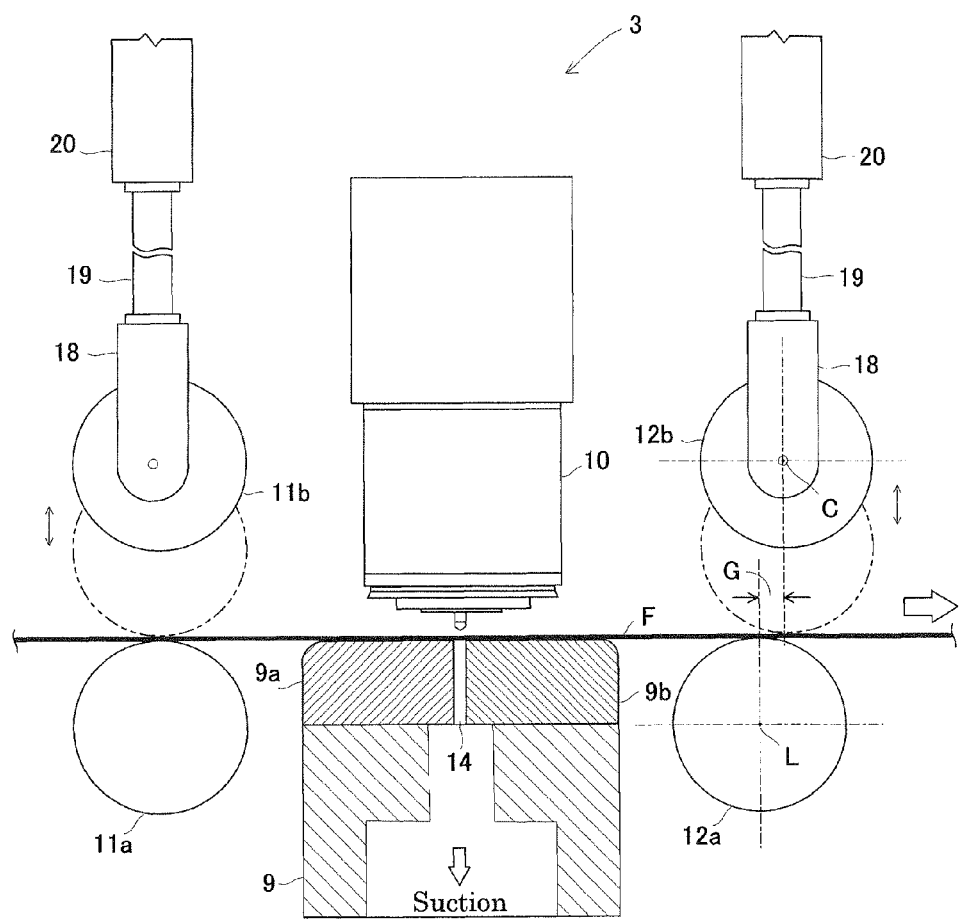
FIG. 2 shows a fractional section view of main components of a cutting mechanism.

As shown in FIGS. 1 and 2, two holding blocks 9a and 9b, which are identical in height with each other, are coupled to and fastened to a surface of the suction table 9 that communicates with and is connected to a suction device 13, with a bolt or the like in proximity to each other along the transport direction of the polarizing film F. That is, opposed inner sidewalls of the holding blocks 9a and 9b form a suction groove 14 which is orthogonal to the transport direction of the polarizing film F. In other words, the suction groove 14 serves as a scan path of a laser beam emitted from the laser device 10.

As shown in FIG. 2, the nip roller 11 (12) includes a lower drive roller 11a (12a) that is coupled to and fastened to a drive mechanism such as a motor and can feed the polarizing film F, and a roller 11b (12b) that vertically moves between an upper standby position and an action position where the roller 11b (12b) nips the polarizing film F in cooperation with the drive roller. The vertical movement of the roller 11b (12b) is effected by an air cylinder 20 that is coupled through a rod 19 to a bracket 18 fastened to a center shaft of the roller with a screw.

The nip roller 12 disposed on the downstream side has a center axis C which is displaced relative to a center axis L of the drive roller 12a toward the downstream side. In the apparatus according to this embodiment, the nip roller 11 (12) has a diameter of 30 mm, and is made of a metal material having a surface coated with an elastic material such as urethane having a hardness of about 30 to 90. A displacement amount G of the center axis C of the roller 12b relative to the center axis L of the downstream drive roller 12a is set to 3 mm. This displacement amount G is appropriately set or changed in accordance with a diameter and a material of a nip roller 11 (12) to be used herein, and a material and a thickness of a polarizing film F to be used herein. For example, the displacement amount G is set within a range of 1 to 5 mm.

The transport mechanism 4 is contiguously disposed as a transport conveyor provided with a transport belt for transporting the polarizing film F which is fed by the nip roller 12 and is placed thereon.

The carrying mechanism 6 includes roller conveyors that are contiguously disposed at a position below a terminal end of the transport mechanism 4. Moreover, a tray 15 is provided at a starting end of the carrying mechanism 6, and receives the polarizing film F which falls from the transport mechanism 4.

A control unit 16 performs overall control of each mechanism. Description of the control unit 16 will be given later as description of operations of the apparatus described above.

The above description is about the configurations and functions of the main components of the optical film cutting apparatus according to the present invention. Next, description will be given of the operations of this apparatus, that is, the operations from the cutting of the strip-shaped polarizing film F to the carriage of the sheet-like polarizing film F.

First, the film supply unit 1 is loaded with a master roll 7 of a polarizing film F to be used herein. After completion of the loading, an operator conducts initial settings by use of an operation panel or the like. For example, the operator sets a length of the cut polarizing film F, a thickness of the polarizing film F, a supply speed of the polarizing film F, output power of a laser beam, a focal depth of the laser beam, and the like. In this embodiment, the thickness of the optical film F is 310 μm, and the focal depth is set to ±0.5 mm.

After completion of the initial settings, the film supply unit 1 starts to supply the polarizing film F from the master roll 7.

Figure 3:
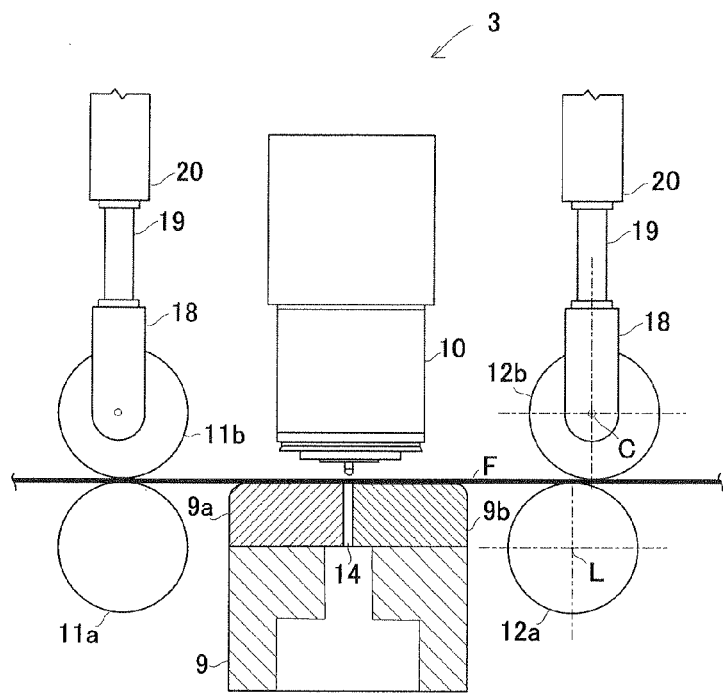
FIG. 3 shows a front view of an operation of a nip roller.

The polarizing film F is transported to the cutting mechanism 3. When a front end of the polarizing film F passes through the nip roller 12 and then reaches a predetermined position, the control unit 16 exerts control to activate the nip rollers 11 and 12, so that the nip rollers 11 and 12 nip the polarizing film F at opposed ends of the suction table. As shown in FIG. 3, herein, the air cylinders 20 coupled to the rollers 11b and 12b are synchronized to simultaneously move the rollers 11b and 12b downward.

The center axis C of the downstream roller 12b is displaced relative to the center axis L of the drive roller 12a in the direction away from a portion to be cut (i.e., toward the downstream side). Therefore, a point where the downstream nip roller 12 nips the polarizing film F is located downward as compared with a point where the upstream nip roller 11 nips the polarizing film F. In a case of nipping the polarizing film F in this state, when a timing at which the upstream nip roller 11 nips the polarizing film F is compared with a timing at which the downstream nip roller 12 nips the polarizing film F, the timing of the nip roller 12 is delayed.

Figure 4:
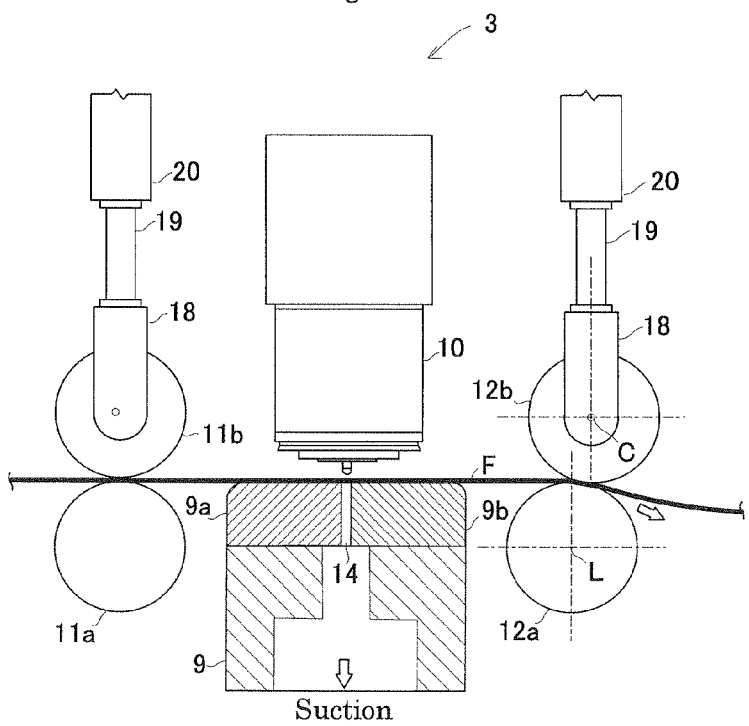
FIG. 4 shows a front view of an operation of the nip roller.

On the upstream side, accordingly, the polarizing film F is fixed by the nip roller 11 with the portion to be cut located between the nip rollers 11 and 12. On the downstream side, in this state, the free front end of the polarizing film F is pulled by the nip roller 12 in the direction away from the portion to be cut as shown by an arrow mark in FIG. 4. As a result, tension is applied to the polarizing film F located between the nip rollers 11 and 12, so that a sag is removed from the polarizing film F.

Moreover, the control unit 16 activates the suction device 13 in this state, so that the suction table 9 suction-holds the polarizing film F.

In accordance with these operations, the control unit 16 exerts control to activate the dancer roller D such that the polarizing film F which is continuously supplied by the film supply unit 1 does not pass the dancer roller D.

The laser device 10 cuts the polarizing film F, which is suction-held on the suction table 9, along the suction groove 14 in the width direction.

When the polarizing film F is cut, the suction by the suction table 9 and the nip by the nip rollers 11 and 12 are canceled. In accordance with this cancelation, the transport mechanism 4 transports the cut polarizing film F toward the carrying mechanism 6. Simultaneously, the control unit 16 exerts control to activate the dancer roller D such that the polarizing film F is fed toward the cutting mechanism 3.

The tray 15 is provided at the starting end of the carrying mechanism 6, and the polarizing film F is stacked on the tray 15.

When the polarizing films F are stacked in predetermined number on the tray 15 by repetition of the series of operations described above, the control unit 16 activates the carrying mechanism 6 to carry the stacked polarizing films F to a subsequent step.

In the apparatus according to this embodiment, the center axis C of the roller 12b forming the nip roller 12 is displaced relative to the center axis L of the drive roller 12a in the direction away from the portion to be cut. Therefore, when the upstream roller 11b and the downstream roller 12b are simultaneously moved downward, the timing at which the downstream nip roller 12 nips the polarizing film F is delayed.

In accordance with this operation, the point where the downstream nip roller 12 nips the polarizing film corresponds to a curved surface portion where the rollers 12a and 12b are opposed to each other, and the curved surface portion is displaced from an uppermost point of the drive roller 12a and a lowermost point of the roller 12b.

Accordingly, when the upstream nip roller 11 nips the polarizing film F, the downstream nip roller 12 nips the polarizing film F so as to pull the polarizing film F in the direction away from the portion to be cut (i.e., toward the downstream side). As a result, tension is applied to the polarizing film F located between the nip rollers 11 and 12 to such an extent that no sag occurs at the polarizing film F, and the polarizing film F is cut by use of the laser beam in this state. In other words, the polarizing film F is cut in the state that no sag occurs thereat; therefore, it is possible to accurately keep the cut polarizing film F at a constant length. Moreover, there occurs no variation of the focal depth of the laser beam; therefore, it is possible to suppress production of smoke due to the variation of the focal depth of the laser beam unless the polarizing film F is cut by heat more than necessary.

The present invention may be embodied in forms modified as described below.

(1) In the apparatus according to the foregoing embodiment, a center axis of the upper roller 11b of the upstream nip roller 11 may be displaced relative to a center axis of the drive roller 11a in a direction away from the portion to be cut (i.e., toward the upstream side). In this case, the two rollers 11b and 12b may be simultaneously moved downward, or any one of the rollers 11b and 12b may be moved downward first.

(2) In the apparatus according to the foregoing embodiment, the laser device is used for cutting the polarizing film F. Alternatively, the polarizing film F may be cut by use of a cutter blade or the like.

(3) In the apparatus according to the foregoing embodiment, a combination of a pair of upper and lower rollers that form the nip roller 11 (12) is not limited to that described in the foregoing embodiment, and any other combination may be employed in the present invention. As such a combination, for example, the drive roller 11a (12a) may be made of a metal material whereas the upper roller 11b (12b) may be made of an elastic material.

(4) The apparatus according to the foregoing embodiment is also applicable to a polarizing film with a separator.

INDUSTRIAL APPLICABILITY

As described above, the present invention is suitable for accurately cutting an optical film.

The invention claimed is:

1. An optical film cutting method for cutting an optical film to obtain a sheet-like member, comprising:
   in a state that, in at least one of two nip rollers each including a pair of upper and lower rollers, the nip rollers being disposed on an upstream side and a downstream side of the strip-shaped optical film being transported with a portion to be cut of the optical film located therebetween in a transport direction, an axis of the upper roller is laterally displaced relative to an axis of the lower roller in a direction away from the portion to be cut, vertically moving one of the upper and lower rollers such that the rollers relatively approach each other to nip the optical film;

cutting the optical film in a width direction in a state that opposed ends of the optical film are nipped by the nip rollers; and vertically moving one of the upper and lower rollers such that the rollers are relatively separated from each other to cancel the nip of the optical film by the nip rollers, after cutting the optical film.

2. The optical film cutting method according to claim 1, wherein in the state that the portion to be cut of the optical film is located between the nip rollers, one of the nip rollers, in which the upper and lower rollers are aligned with each other in a vertical direction, nips one of the upstream side and the downstream side of the optical film, and then the other nip roller, in which the upper and lower rollers are misaligned with each other, nips the other side of the optical film.

3. The optical film cutting method according to claim 1, wherein the optical film is cut by use of a laser beam.

4. The optical film cutting method according to claim 2, wherein the optical film is cut by use of a laser beam.

5. The optical film cutting method according to claim 4, wherein the opposed ends of the optical film are nipped by the nip rollers with the portion to be cut located between the nip rollers, and then the optical film is cut by use of the laser beam while the portion to be cut is sucked.

6. The optical film cutting method according to claim 3, wherein the opposed ends of the optical film are nipped by the nip rollers with the portion to be cut located between the nip rollers, and then the optical film is cut by use of the laser beam while the portion to be cut is sucked.

7. An optical film cutting apparatus for cutting an optical film to obtain a sheet-like member, comprising:

a supply device that supplies the strip-shaped optical film;

a tension applying mechanism including two nip rollers each including a pair of upper and lower rollers, the nip rollers being disposed on an upstream side and a downstream side of the optical film being transported from the supply device, wherein in at least one of the nip rollers, an axis of the upper roller is laterally displaced relative to an axis of the lower roller in a direction away from a portion to be cut; and a cutting device that cuts the optical film applied with tension by the tension applying mechanism in a transport direction.

8. The optical film cutting apparatus according to claim 7, wherein the cutting device is a laser device.

9. The optical film cutting apparatus according to claim 8, comprising a suction table opposed to the laser device with the optical film interposed therebetween to suction-hold the optical film.

* * * * *